Oct. 5, 1937.   K. HOFFMANN   2,095,132
SAFETY ARRANGEMENT FOR HIGH PRESSURE ELASTIC FLUID TURBINES
Filed March 3, 1936
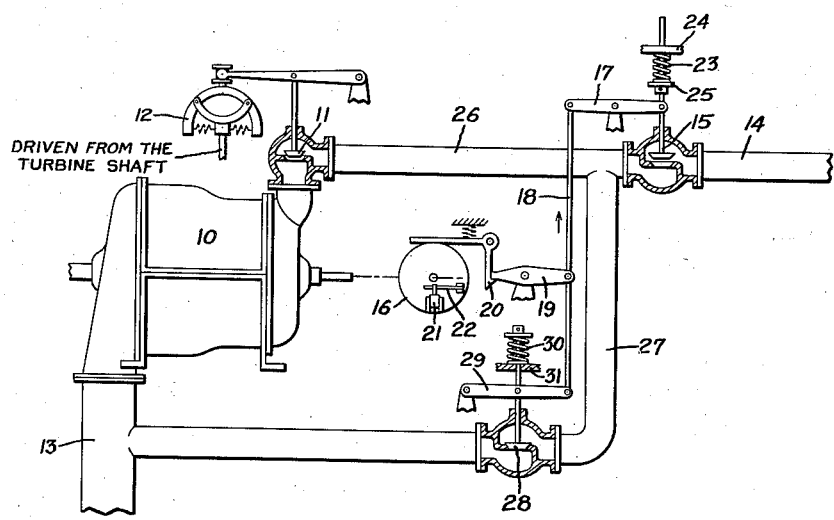
Inventor:
Karl Hoffman,
by Harry E. Dunham
His Attorney.

Patented Oct. 5, 1937

2,095,132

UNITED STATES PATENT OFFICE 2,095,132

SAFETY ARRANGEMENT FOR HIGH PRESSURE ELASTIC FLUID TURBINES

Karl Hoffmann, Berlin-Falkensee, Germany, assignor to General Electric Company, a corporation of New York Application March 3, 1936, Serial No. 66,958
In Germany March 9, 1935

3 Claims. (Cl. 137—158)

The present invention relates to safety arrangements for high pressure elastic fluid turbines. These turbines are usually provided with a control or inlet valve operated by a speed governor to control the flow of elastic fluid to the turbine and an emergency valve or quick-closing valve to shut off the turbine during emergency conditions. In many cases the emergency valve is considerably spaced from the control valve so that a considerable amount of elastic fluid is entrapped in the conduit portion between the two valves, an amount which may be sufficient to speed up the turbine after the emergency valve has been closed.

The object of my invention is to provide an improved construction and arrangement to reduce or eliminate the speeding up of high pressure turbines due to elastic fluid entrapped in the conduit between the emergency valve and the control valve after the latter has been closed. This is accomplished in accordance with my invention by the provision of means comprising an auxiliary conduit including a valve and connected at one end behind the emergency valve as regards the direction of flow therethrough and means for automatically opening said auxiliary valve in response to closing of the emergency valve in order to discharge elastic fluid entrapped in the conduit between the emergency valve and the control valve to a point of lower pressure, preferably to the exhaust of the high pressure turbine.

For a better understanding of what I believe to be novel and my invention, attention is directed to the following description and the claims appended thereto in connection with the accompanying drawing.

The single figure of the drawing represents a safety arrangement embodying my invention in connection with a high pressure, non-condensing turbine.

The arrangement comprises a high pressure, non-condensing turbine 10 having an inlet or control valve 11 adjacent the turbine and positioned by a speed governor 12 driven from the turbine shaft. The exhaust end of the turbine is connected to an exhaust conduit 13 for conducting elastic fluid to other consumers, not shown. Elastic fluid is conducted to the turbine inlet by a supply or inlet conduit 14 including an emergency or quick-closing valve 15 controlled by an emergency governor 16 driven from the turbine shaft. The emergency valve 15 is connected to the right-hand end of a fulcrumed lever 17, which latter has its left-hand end pivotally connected to a rod 18. An intermediate point of the rod 18 is connected to a fulcrumed lever 19 held in position by a latch 20. The emergency speed governor 16 includes a flyweight 21 biased inwardly by a spring 22 against the centrifugal force exerted thereon. As the speed of the turbine increases beyond a certain value, the flyweight 21 is forced radially outward by the action of centrifugal force against the biasing force of the spring 22 and at a certain speed removes the latch 20 from the lever 19. This causes closing of the valve 15 by the action of a compression spring 23 surrounding the valve stem and bearing at the upper end against a fixed support 24 and at the lower end against an abutment 25 secured to the stem of the emergency valve.

The emergency valve 15 is considerably spaced from the control valve 11 by a conduit portion 26. A considerable amount of elastic fluid is entrapped in this portion after closing of the valve 15, which amount may be sufficient to speed up the turbine 10 to assume dangerous speeds after closing of the valve 15. This is overcome by my invention by the provision of means for automatically draining or discharging high pressure elastic fluid from the inlet conduit portion 26 after closing of the valve 15. This means comprises a conduit 27 connected at one end to the conduit portion 26 and at the other end to a point of lower pressure, in the present instance to the exhaust conduit 13. The auxiliary conduit 27 includes an auxiliary valve 28 which has a valve stem pivotally connected to an intermediate point of a lever 29 fulcrumed at its left-hand end and pivotally connected at its right-hand end to the lower end of the link 18. The valve 28 is biased towards opening position by a spring 30 surrounding the valve stem and bearing at its upper end towards an abutment secured to the valve stem and at its lower end towards a fixed support 31. It is to be noted that whereas the emergency valve 15 is biased by the spring 23 towards closing position, the auxiliary valve 28 is biased by the spring 30 towards opening position. During normal conditions, the emergency valve 15 is held open and the auxiliary valve 28 closed by the latch 20 of the emergency speed governor. If during operation the turbine speed rises beyond a certain value the lever 19 is unlatched so that the emergency valve 15 is automatically closed and the auxiliary valve 28 simultaneously opened. The elastic fluid then contained in the conduit portion 26 is drained through the auxiliary conduit 27 and discharged into the exhaust conduit 13.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. An elastic fluid turbine arrangement including the combination of an elastic fluid turbine, an inlet conduit for conducting elastic fluid to the turbine, a control valve in the conduit adjacent the turbine, an emergency valve in the conduit spaced from the control valve, a considerable distance which ordinarily would permit the accumulation of an amount of elastic fluid sufficient to prevent quick stopping of the turbine after the emergency valve has been closed, and means comprising an auxiliary conduit connected to the first named conduit intermediate the control valve and the emergency valve and an auxiliary valve in the auxiliary conduit for automatically discharging elastic fluid from the inlet conduit in response to closing of the emergency valve.

2. An elastic fluid turbine arrangement including the combination of a high pressure non-condensing elastic fluid turbine, an inlet conduit for conducting elastic fluid to the turbine, an exhaust conduit for discharging exhaust from the turbine, an inlet valve in the inlet conduit adjacent the turbine, a speed governing mechanism comprising a speed governor driven from the turbine shaft for controlling the inlet valve, an emergency valve in the inlet conduit considerably spaced from the inlet valve, means including an emergency governor driven by the turbine shaft for automatically closing the emergency valve as the turbine speed reaches a fixed value, an auxiliary conduit including an auxiliary valve and having one end connected to the inlet conduit at a point intermediate the inlet valve and the emergency valve and the other end connected to the exhaust conduit, and means for connecting the emergency valve to the emergency speed governor normally to maintain shut the auxiliary valve and automatically to open the auxiliary valve as the speed rises to said fixed value.

3. An elastic fluid turbine arrangement including the combination of an elastic fluid turbine having an exhaust conduit, an inlet conduit for conducting elastic fluid to the turbine, a control valve in the inlet conduit adjacent the turbine, an emergency valve in the inlet conduit considerably spaced from the control valve, and means for automatically discharging elastic fluid from the inlet conduit into the exhaust conduit in response to closing of the emergency valve, said means comprising an auxiliary conduit having one end connected to the inlet conduit intermediate the control valve and the emergency valve and another end connected to the exhaust conduit, and an auxiliary valve in the auxiliary conduit.

KARL HOFFMANN.